(12) United States Patent
Gritzner et al.

(10) Patent No.: US 11,865,757 B2
(45) Date of Patent: Jan. 9, 2024

(54) METHOD AND APPARATUS FOR PROCESSING A FORMABLE MATERIAL

(71) Applicant: Processing Technologies International, LLC, Aurora, IL (US)

(72) Inventors: Mitchell L Gritzner, Montgomery, IL (US); Dana R. Hanson, St. Charles, IL (US); Matthew Owen Banach, Sugar Grove, IL (US)

(73) Assignee: Processing Technologies International, LLC, Aurora, IL (US)

( * ) Notice: Subject to any disclaimer, the term of this patent is extended or adjusted under 35 U.S.C. 154(b) by 351 days.

(21) Appl. No.: 16/990,307

(22) Filed: Aug. 11, 2020

(65) Prior Publication Data

US 2022/0048229 A1 Feb. 17, 2022

(51) Int. Cl.
| | | |
|---|---|---|
| *B29C 48/00* | (2019.01) | |
| *B29C 48/08* | (2019.01) | |
| *B29C 51/22* | (2006.01) | |
| *B29C 48/025* | (2019.01) | |
| *B29C 51/10* | (2006.01) | |
| *B29C 48/355* | (2019.01) | |

(52) U.S. Cl.
CPC ........ *B29C 48/0017* (2019.02); *B29C 48/025* (2019.02); *B29C 48/08* (2019.02); *B29C 48/355* (2019.02); *B29C 51/10* (2013.01); *B29C 51/225* (2013.01)

(58) Field of Classification Search
CPC ....... B29C 51/225; B29C 59/06; B29C 51/02; B29C 48/0017; B29C 48/025; B29C 48/0022
See application file for complete search history.

(56) References Cited

U.S. PATENT DOCUMENTS

| | | | | |
|---|---|---|---|---|
| 2,842,796 | A * | 7/1958 | Rhodes .................. | B29C 48/08 425/374 |
| 4,421,712 | A * | 12/1983 | Winstead ............... | B29C 51/22 264/554 |
| 5,783,229 | A * | 7/1998 | Manlove .............. | B29C 51/225 264/550 |
| 2010/0303943 | A1 * | 12/2010 | Hanson .................. | B29C 48/08 425/114 |
| 2012/0298032 | A1 * | 11/2012 | Mazzarolo ............ | B65D 47/06 118/46 |
| 2019/0039328 | A1 * | 2/2019 | Eickhoff ................. | B29C 51/22 |

* cited by examiner

*Primary Examiner* — Jerzi H Moreno Hernandez
(74) *Attorney, Agent, or Firm* — Wood, Phillips, Katz, Clark & Mortimer

(57) ABSTRACT

A method and apparatus for processing a formable material having at least first and second relatively repositionable units. The first unit has a sheet die, with the second unit having a rotary drum with a peripheral forming surface for receiving flowable material from the sheet die. The first and second units can be selectively changed between an operating relationship and a setup relationship, with the latter causing at least one space to be defined/enlarged and within which an operator can maneuver to gain access to a region of at least one of the first and second units. With the first and second units in the operating relationship, moldable sheets can be processed by causing the moldable sheets to be applied, and conformed, to the peripheral forming surface on the rotary drum.

38 Claims, 8 Drawing Sheets

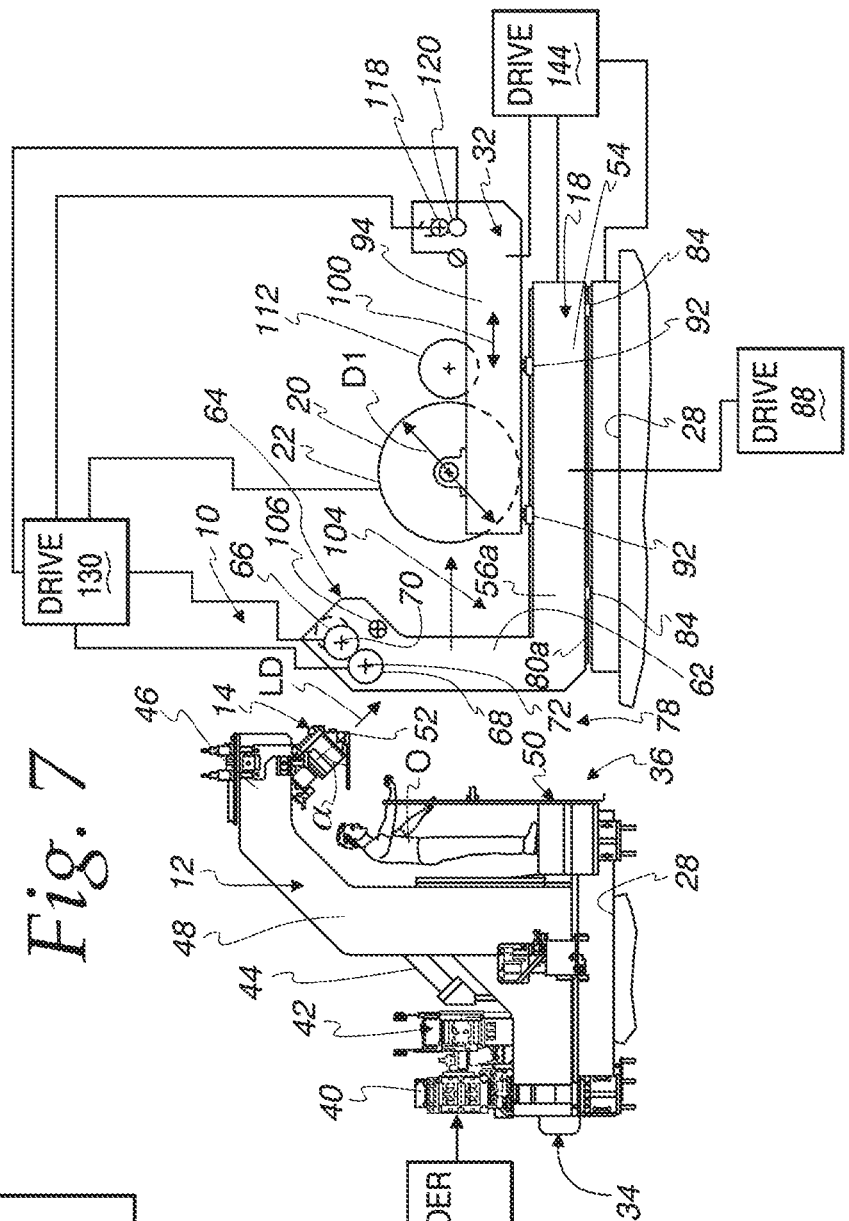

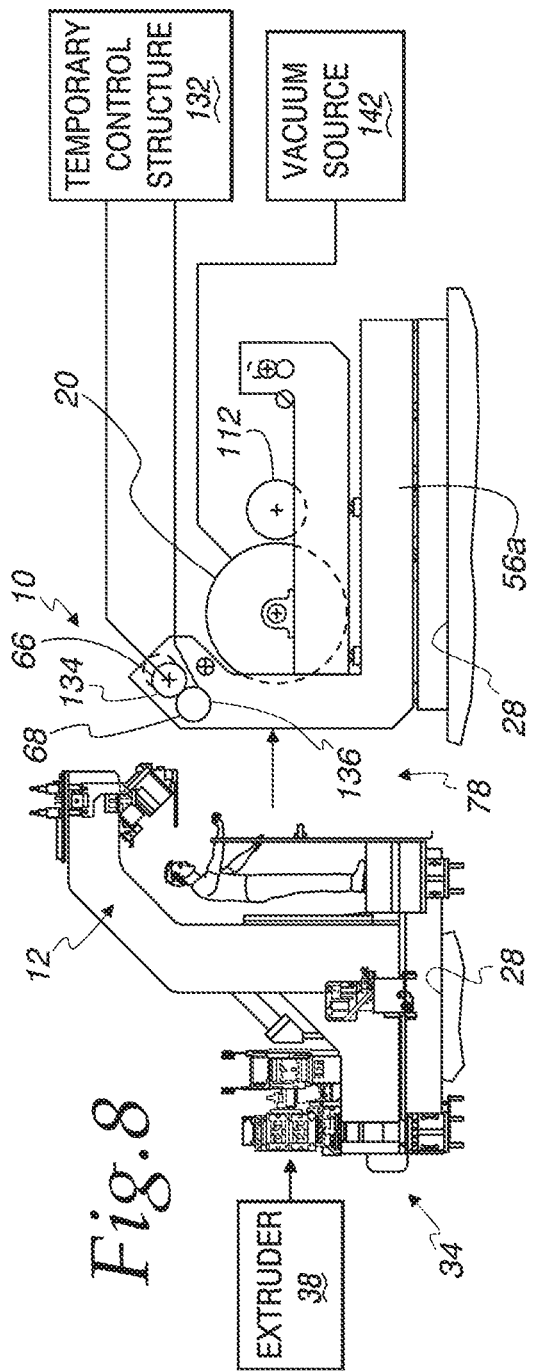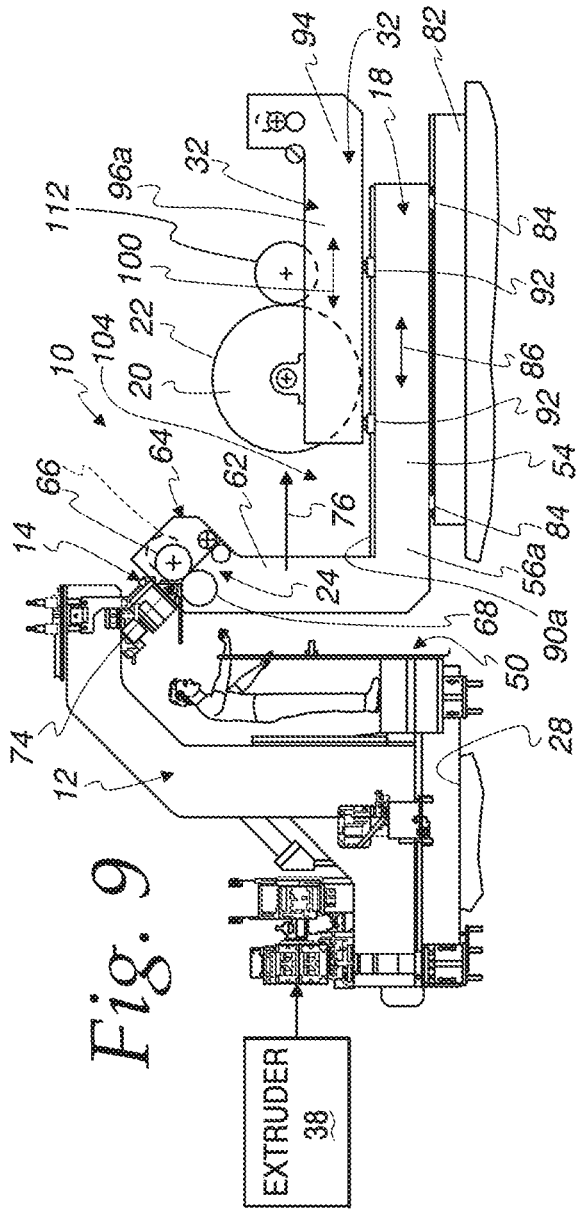

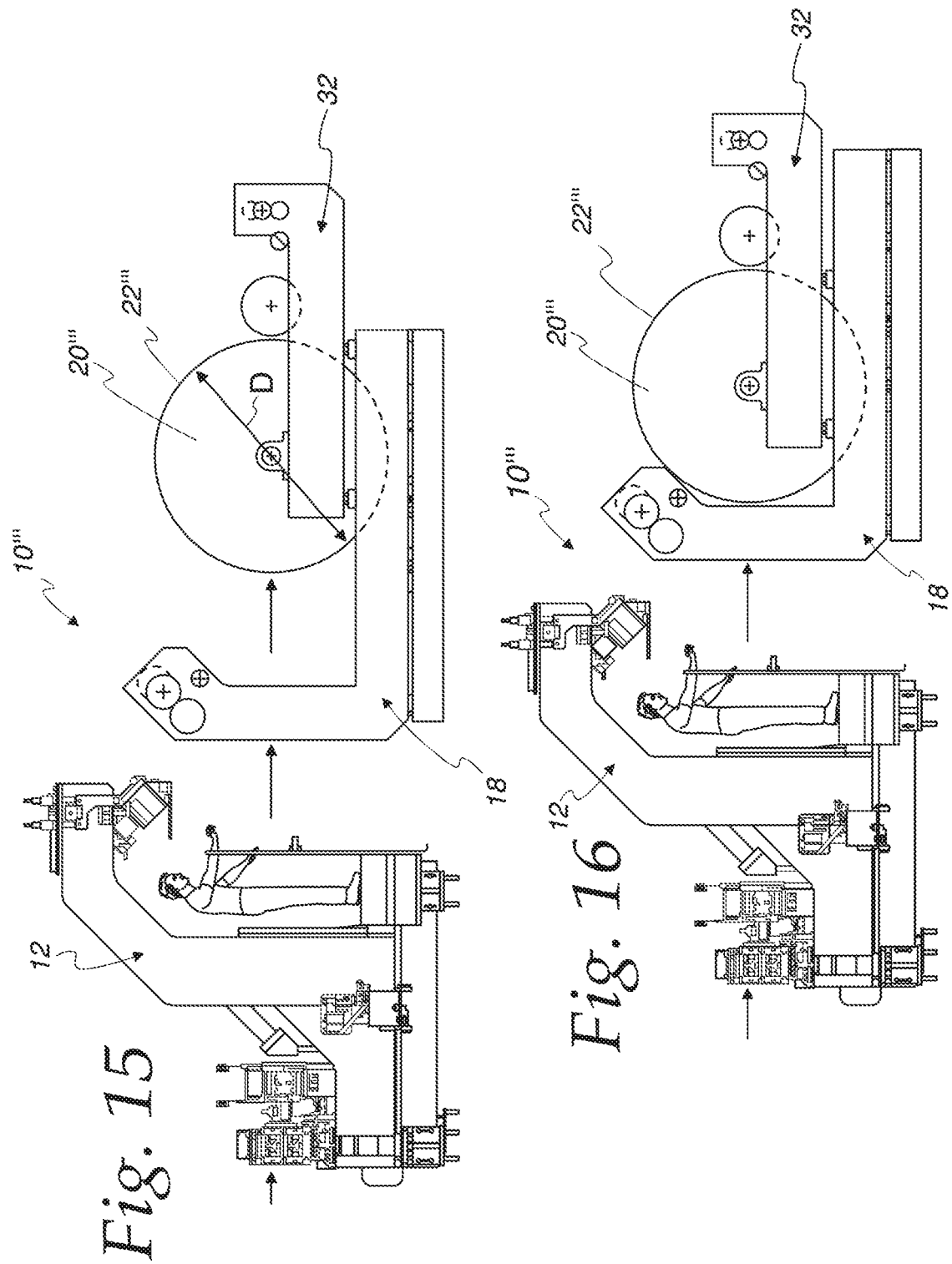

METHOD AND APPARATUS FOR PROCESSING A FORMABLE MATERIAL

BACKGROUND OF THE INVENTION

Field of the Invention

This invention relates to a method and apparatus for processing a formable material through application of a moldable sheet layer against a peripheral forming surface on a rotary drum.

Background Art

There are several different ways of forming plastic articles, such as those used in food and beverage holding applications, including but not limited to shallow drawn plates, lids, cups, etc.

The above and other similar articles are commonly made using either an injection molding process or a thermoforming process. The thermoforming process is in turn commonly broken into two categories.

In a first thermoforming category, a sheet is delivered to flat-bed thermoforming equipment. The sheet may be pre-formed and accumulated by being wound into a cylindrical shape, from where the sheet material is continuously paid off and advanced to the thermoforming equipment. Alternatively, the sheet may be formed, as by extrusion, using roll stands which incorporate rolls which cooperate to produce nipping locations that shape the extruded material, which is continuously fed to the thermoforming equipment.

In a second thermoforming category, a sheet is extrusion formed and, rather than being directed through a nip location on cooperating rolls, is commonly fed directly to a rotary mold, as with a drum shape with discrete cavities formed through the peripheral surface thereof.

Thermoforming using a rotary drum is currently used for many thin gage plastic parts. Typically, these parts are formed using an extruder which feeds a sheet die that produces a sheet form. The die discharge is positioned to feed the molten/moldable plastic sheet downwardly onto a rotary drum at a thermoforming station. The sheet will commonly be drawn into discrete cavities on the rotary drum by vacuum, whereupon one surface of the sheet will conform against the surrounding cavity surface that dictates the shape of the end article.

In a typical thermoforming apparatus, the rotary drum is mounted on a frame with connected utilities that permit a "curtain" of molten plastic to be cast onto the peripheral surface of the drum for molding shapes therein associated with the ultimately generated shallow drawn plastic parts. Typically, there is a guide roller situated relative to the rotary drum to control delivery of the curtain at the desired location thereon. This guide roller is movable guidingly in an orbiting path around the perimeter of the drum and is capable of being secured at strategically selected locations to produce the desired placement of the moldable sheet against the forming surface of the rotary drum. The drum is mounted to be individually movable towards and away from the unit that produces the molten sheet and is likewise commonly guidingly movable side-to-side, transversely to the aforementioned movement and the path of the sheet through the apparatus. The rotary drum is commonly supported on casters which cooperate with tracks to guide this side-to-side movement.

Apparatus of the type described above are generally reconfigurable to produce parts with potentially different thicknesses and configuration. Accordingly, it is necessary to be able to change the relationship between the operative rotary drum and the upstream and downstream cooperating components. It is also desirable to be able to interchange rotary drums with different diameters and surface configurations to enhance the versatility of each apparatus.

Typically, rotary thermoforming apparatus have relatively large components which require a relatively large overall operating footprint. In virtually all operations in which such apparatus are used, space minimization is an objective. At the same time, the ability to access different parts of the apparatus to: a) interchange components; b) effect initial setup; c) make adjustments; d) effect repairs, etc., is critical. While limiting space requirements is always a focus, system efficiencies also focus on the ability of personnel to safely, conveniently, and efficiently access different regions of the apparatus to carry out the above steps. With fixed relationships between major components on the apparatus, there currently exists a limited ability of most systems to be conveniently reconfigured without building in greater access spacing that generally increases the footprint and volume of the overall apparatus. Thus, compact system configurations and efficient control and operation are generally competing objectives in these apparatus designs.

The industry continues to seek out configurations that have compact designs, and are easily and efficiently controlled, maintained, and operated, with the critical objective of affording convenience and safety for operating personnel.

SUMMARY OF THE INVENTION

In one form, the invention is directed to a method of processing a formable material. The method includes the step of obtaining an apparatus having: a first unit with a sheet die configured to controllably discharge a material in flowable form delivered from a supply to the sheet die; a sheet control assembly; and a second unit with a rotary drum having a peripheral forming surface. The sheet control assembly is upstream of the rotary drum and is configured to continuously control material discharged from the sheet die to be applied as a formable sheet to the peripheral forming surface on the rotary drum. The method further includes the step of selectively, controllably, relatively situating the first and second units between: i) an operating relationship wherein the sheet die is situated relative to the sheet control assembly to discharge material at an entry location on the sheet control assembly; and ii) a setup relationship wherein a space is one of defined or enlarged, as an incident of the first and second units being changed from the operating relationship, within which an operator can maneuver to gain access to a region of at least one of the first unit and second unit. The method further includes the step of changing the first and second units from the setup relationship into the operating relationship by guidingly moving at least one of the first and second units relative to the other of the first and second units in a first predetermined path. With the first and second units in the operating relationship, the method further includes the steps of: A) causing the material from the supply to be discharged from the sheet die at the entry location; B) causing the sheet control assembly to treat the discharged material which is a moldable sheet of predetermined thickness; C) causing the moldable sheet to be applied to the peripheral forming surface on the rotary drum as the rotary drum is turned around an axis; D) causing the applied sheet to separate from and advance away from the rotary drum; and E) causing further processing of the sheet downstream of the rotary drum.

In one form, the step of obtaining an apparatus further includes the step of obtaining an apparatus having a third unit with a rotary drum. The method further includes the step of selectively controllably relatively situating the first and third units between: a) an operating relationship wherein the rotary drum is situated so that the moldable sheet from the sheet control assembly can be applied to the peripheral surface on the rotary drum; and b) a setup relationship wherein a space is one of defined or enlarged, as an incident of the first and third units being changed from their operating relationship, within which an operator can maneuver to gain access to a region of at least one of the first, second, and third units. The method further includes the steps of: i) placing the first and second units into their operating relationship; ii) changing the first and third units from their setup relationship into their operating relationship by guidingly moving at least one of the first and third units relative to the other of the first and third units in a second predetermined path; and iii) with the first and second units in their operating relationship and the first and third unit in their operating relationship, carrying out steps A)-E).

In one form, the step of changing the first and third units between their setup and operating relationship involves moving the third unit in the second predetermined path.

In one form, the third unit is provided on the second unit. The second unit is movable relative to the first unit in the first predetermined path. The method further includes the step of moving the third unit together with the second unit as the second unit is moved in the first predetermined path.

In one form, the method further includes the step of moving the third unit guidingly relative to the second unit as the third unit is moved in the second predetermined path.

In one form, the first and second predetermined paths are substantially straight.

In one form, the first and second predetermined paths are substantially parallel.

In one form, the method further includes the step of guidingly moving the rotary drum relative to the sheet die in a direction substantially parallel to the axis of the rotary drum.

In one form, the peripheral forming surface on the rotary drum is contoured. The step of applying the moldable sheet to the peripheral forming surface includes causing the moldable sheet to conform to the contoured peripheral forming surface to thereby form discrete part shapes in the sheet.

In one form, the step of further processing the sheet involves trimming the sheet to separate discrete parts.

In one form, the sheet control assembly has first and second cooperating rolls. The sheet has oppositely facing surfaces. The method further includes the step of conditioning the oppositely facing sheet surfaces, one each with the first and second rolls.

In one form, the rotary drum has a first diameter. The method further includes the step of substituting for the rotary drum with the first diameter a replacement rotary drum of a second diameter that is different than the first diameter.

In one form, the peripheral forming surface of the rotary drum has a first contoured configuration. The method further includes the step of substituting for the rotary drum a replacement rotary drum with a contoured configuration different than the first contoured configuration.

In one form, the third unit has a cooperating pair of nipping rolls downstream of the forming drum. The step of causing further processing involves causing the sheet advanced away from the forming drum to be advanced to and between the cooperating pair of nipping rolls.

In one form, the sheet control assembly has first and second cooperating rolls. The method further includes the step of strategically controlling temperature of the sheet applied to the peripheral forming surface of the rotary drum through the first and second rolls.

In one form, the method further includes the step of causing each of the first and second cooperating rolls to be driven.

In one form, the method further includes the step of obtaining a supply of material that is a plastic material that is at least one of: polypropylene (PP); polystyrene (PS); polylactic acid (PLA); a bio-resin; polyethylene terephthalate (PET); and polyethylene (PE).

In one form, the sheet is moved between upstream and downstream ends of the apparatus in a path at a rate of 20-250 feet per minute.

In one form, the sheet control assembly has first and second cooperating rolls. The method further includes the step of causing each of the first and second cooperating rolls, the forming drum, and the cooperating pair of nipping rolls to be driven around respective axes.

In one form, the method further includes the step of strategically causing a degree of wrap of the sheet against the peripheral forming surface on the rotary drum to be changed.

In one form, the invention is directed to the apparatus described above.

In one form, the apparatus further includes a third unit consisting of a rotary drum. The apparatus is configured so that the first and third units are controllably relatively repositionable between: a) an operating relationship wherein the rotary drum is situated so that the moldable sheet from the sheet control assembly can be applied to the peripheral surface on the forming drum; and b) a setup relationship, wherein a space is one of defined or enlarged as an incident of the first and third units being changed from their operating relationship within which an operator can maneuver to gain access to a region of at least one of the first, second, and third units, by moving at least one of the first and third units relative to the other of the first and third units in a second predetermined path.

In one form, the second unit moves in the first predetermined path relative to the first unit.

In one form, the third unit moves in the second predetermined path relative to the first unit.

In one form, the second unit is guided in linear movement relative to a support in the first predetermined path through at least one of: a) linear bearings on captured rails; b) cam followers; c) sliders; and d) rollers.

In one form, the apparatus further includes a drive for moving the second unit selectively in opposite directions in the first predetermined path.

In one form, the third unit moves in the second predetermined path through cooperating guide structure on the second and third units.

In one form, the second unit moves in the first predetermined path relative to the first unit. The apparatus is configured so that the third unit is caused to move in the second predetermined path by following movement of the second unit in the first predetermined path.

In one form, the second and third units are guided in linear relative movement relative to each other through at least one of: a) linear bearings on captured rails; b) cam followers; c) sliders; and d) rollers.

In one form, the rotary drum is movable guidingly on the second unit in a direction transverse to the second predetermined path.

In one form, the peripheral surface on the rotary drum is contoured to form discrete parts shapes in a moldable sheet applied thereagainst.

In one form, the sheet control assembly has first and second cooperating rolls. The first and second cooperating rolls are configured to set a sheet thickness and to condition opposite surfaces of a sheet directed therebetween.

In one form, that apparatus further includes a guide roller on the second unit that is movable to strategically change a degree of wrap of a sheet against the peripheral forming surface on the rotary drum.

In one form, the apparatus further includes a cooperating pair of nipping rolls downstream of the rotary drum between which a sheet being formed is directed.

In one form, the apparatus further includes a trimming station configured to separate discrete parts defined by discrete shapes in a sheet produced by the peripheral forming surface on the rotary drum.

In one form, the apparatus further includes a take-off wheel downstream of the rotary drum to guide movement of a sheet away from the rotary drum.

In one form, the apparatus has at least one drive for driving each of the first and second cooperating rolls, the cooperating pair of nipping rolls, and the rotary drum around respective axes.

In one form the apparatus further includes temperature control structure on the first and second cooperating rolls.

In one form, a spacing between: a) the rolls in the cooperating pair of nipping rolls; and b) the first and second cooperating rolls is selectively variable.

In one form, the peripheral forming surface of the rotary drum has an axial dimension in the range of 12" to 96".

BRIEF DESCRIPTION OF THE DRAWINGS

FIG. 6 is a schematic representation of an alternative form of the apparatus including an additional unit;

FIG. 7 is a partially schematic, side elevation view of one form of apparatus, as shown schematically in FIGS. 1, 2, and 6, and with second and third units in a setup relationship with a first unit;

FIG. 8 is a view as in FIG. 7 wherein the second unit is in a second setup relationship with the first unit;

FIG. 9 is a view as in FIGS. 7 and 8 with the second unit in an operating relationship with the first unit and the second unit in a setup relationship with the first unit;

FIGS. 15-19 correspond successively to FIGS. 7-11 and show the apparatus modified by changing the configuration of the rotary drum therein to one having at least a different diameter.

DETAILED DESCRIPTION OF THE PREFERRED EMBODIMENT

Figure 1:
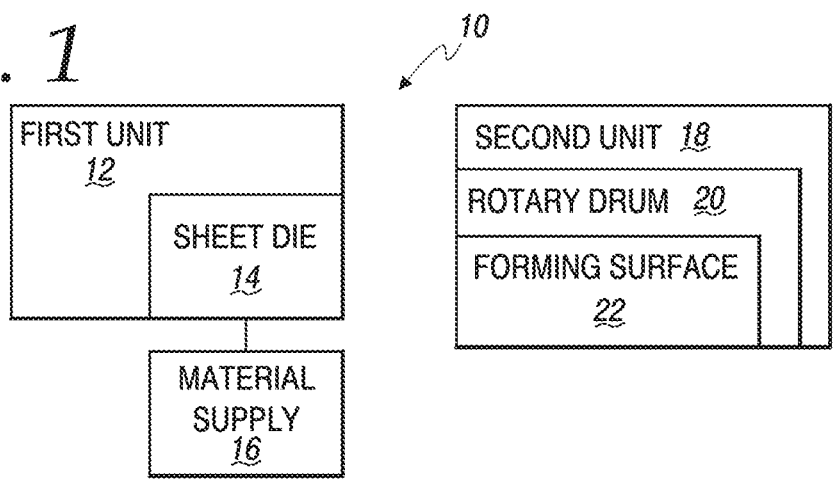
FIG. 1 is a schematic representation of an apparatus for processing a formable material, according to the invention, and including first and second units.

In FIG. 1, an apparatus for processing a formable material, according to the present invention, is shown schematically at 10. The apparatus 10 consists of a first unit 12 having a sheet die 14 configured to controllably discharge a material in a flowable form delivered from a supply 16 to the sheet die 14.

The apparatus 10 further includes a second unit 18 with a rotary drum 20 having a peripheral forming surface 22.

Figure 2:
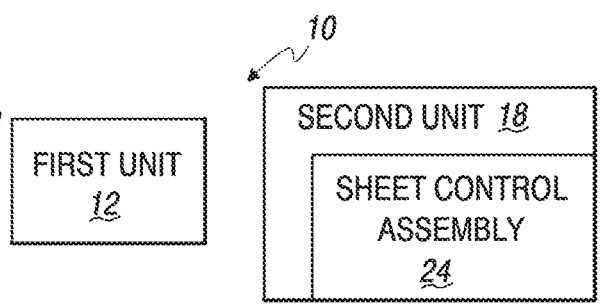
FIG. 2 is a schematic representation of the first and second units in FIG. 1 and showing additional detail of the second unit.

As shown schematically in FIG. 2, the apparatus 10, in addition to the first unit 12, has a sheet control assembly 24 that is part of the second unit 18.

Figure 3:
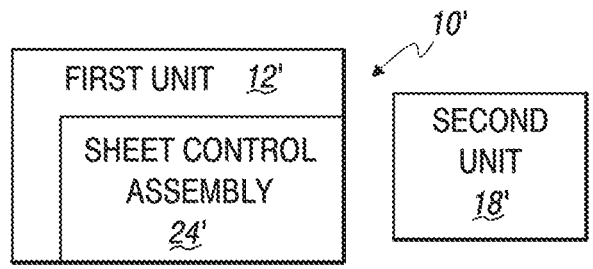
FIG. 3 is a schematic representation of an alternative form of the inventive apparatus, including first and second units, with a modified form of first unit.

Alternatively, a modified form of apparatus 10' is shown in FIG. 3 wherein the sheet control assembly 24' is part of a first unit 12' which, together with a second unit 18', makes up all or part of the apparatus 10'.

Figure 4:
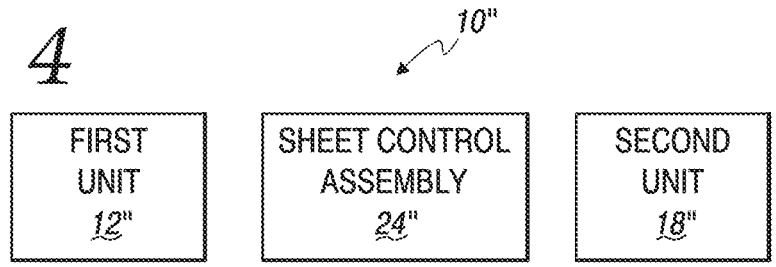
FIG. 4 is a schematic representation of a further modified form of the inventive apparatus having modified first and second units.

In a still further alternative form, as shown in FIG. 4, a modified form of apparatus 10" consists of a first unit 12" and a second unit 18" with a sheet control assembly 24" separate from each of the first unit 12" and the second unit 18".

As used herein, a "unit" is intended to encompass a single component or collection of components that is fixed together or built upon a common frame so as to define a module. It is contemplated that relative movement can occur between the various units to establish different configurational relationships. Generally, the relationships are distinguished as operating and setup relationships. In turn, the units may have different relative positions in each of the operating and setup relationships, which are strategically established to facilitate setup, reconfiguration, maintenance, repair, etc. of the apparatus.

The exemplary sheet control assembly 24 is upstream of the rotary drum 20 and configured to continuously control material discharged from the sheet die 14 to be applied as a formable sheet to the peripheral forming surface 22 on the rotary drum 20.

Relative movement between the first and second units 12, 18 can be effected by having either of the units 12, 18 stationary, with the other movable guidingly relative thereto. As noted above, through relative movement between the first and second units 12, 18: a) an operating relationship can be established wherein the sheet die 14 is situated relative to the sheet control assembly 24 to discharge material at an entry location on the sheet control assembly 24; and b) a setup relationship wherein a space is one of defined or enlarged, as an incident of the first and second units being changed from the operating relationship, within which an operator can maneuver to gain access to a region of at least one of the first unit 12 and second unit 18.

Figure 5:
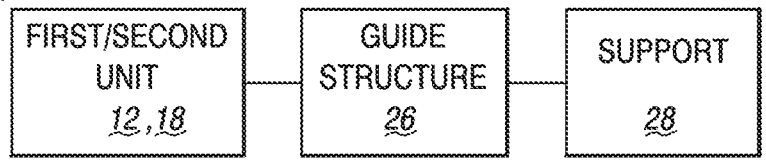
FIG. 5 is a schematic representation of guide structure cooperating between the first and second units and a support for the apparatus.

Whether it is the first unit 12 and/or second unit 18 that is movable, a predetermined path is defined therefor through appropriate guide structure, shown generically at 26 in FIG. 5. The guide structure 26 may act directly between the units 12, 18 themselves and/or between one or both of the first and second units 12, 18 and a foundational support 28 for the apparatus 10.

The guide structure 26 may guide movement in different predetermined paths which may be linear or non-linear.

Each unit, depicted generally at 30 in FIG. 6, may include at least one additional unit/subunit 32.

The schematic showing in FIGS. 1-6 is intended to generically depict components and their interaction. The particular embodiments described below are exemplary in nature only, under the umbrella of the generic apparatus drawings in FIGS. 1-6. The specific embodiments are set forth only as examples and are not to be viewed as limiting.

Referring now to FIGS. 7-13, an exemplary form of apparatus 10 is depicted in several different states. As noted, the exemplary form is not to be viewed as limiting in nature and, with the inventive teachings in hand, many of the components and their interaction could be changed significantly without departing from the invention.

In this embodiment, the apparatus consists of a first unit 12, a second unit 18, and a third unit 32. Each of the units 12, 18, 32 consists of multiple components with relative movement between the units 12, 18, 32 precisely guided to allow the different relationships, described above, to be realized.

In this embodiment, the first unit 12 is fixed to the support 28 for the entire apparatus 10. The support 28 might be a stationary foundation, such as a fixed floor.

The first unit 12 has upstream and downstream ends, 34, 36, respectively.

An extruder 38, having any of a number of well-known structures, is fed material from a supply 16. The material is not limited in terms of its composition and is preferably a plastic material that is at least one of: polypropylene (PP); polystyrene (PS); polylactic acid (PLA); a bio-resin; polyethylene terephthalate (PET); and polyethylene (PE).

From the extruder 38, the material moves successively through a melt filter 40 and a melt pump 42, from where flowable material is delivered through one or more conduits 44 to the sheet die 14. The sheet die 14 is mounted to depend from a cantilevered arm 46 that is part of a frame 48 that is anchored to the support 28 and in turn supports the aforementioned operating components.

The sheet die 14 is generally of the type shown in U.S. Pat. No. 10,406,738, the disclosure of which is incorporated herein by reference. As depicted, the line of discharge LD is at an angle $\alpha$ to horizontal.

Beneath the arm 46, an operator access platform 50 is provided along which an operator O is allowed to maneuver in a side-to-side direction beneath the sheet die 14 and slightly upstream of an outlet slot 52 on the sheet die 14.

The second unit 18 consists of a frame 54 with a generally "J" shape as viewed from a side perspective. As depicted, the frame 54 consists of laterally spaced frame parts 56a, 56b of like "J" shape, and joined by suitable connecting structure 60 so that the frame parts 56a, 56b move together as one piece.

Each of the frame parts 56a, 56b is shown with a similar construction and cooperates with other components on the unit 18 in the same fashion. The description herein will be limited to the exemplary frame part 56a.

The shorter leg 62 of the "J" has an offset free end 64 at which the sheet control assembly 24 is located.

The sheet control assembly 24 consists of first and second cooperating rolls 66, 68 which turn around parallel axes 70, 72, respectively. The cooperating rolls 66, 68 perform as nipping calibration rolls and are relatively movable, in this case by having the roll 66 guidingly movable relative to the frame 54 selectively towards and away from the roll 68, respectively between the solid and dotted line positions as shown in FIG. 7, to thereby select a spacing therebetween determining the thickness of the sheet material passed between the rolls 66, 68.

The ability to space the rolls 66, 68 a significant distance also facilitates cleaning of, and around, the rolls 66, 68, sheet threading, etc. Further, roll adjustment permits selection of contact angle to allow precision temperature control on opposite sides of a sheet.

In FIG. 9, the first and second units 12, 18 are shown in an operating relationship wherein the sheet die 14 is situated relative to the sheet control assembly 24 to discharge material at an entry location 74 on the sheet control assembly 24 that is immediately upstream of a nip location defined by the rolls 66, 68.

With the first and second units 12, 18 in this operating relationship, the operator O on the platform 50 is elevated above the support surface 28 by the platform 50 and is in close proximity to both the sheet die 14 and sheet control assembly 24, thereby facilitating setup, adjustment, and inspection of the components on, and cooperating between, the sheet die 14 and sheet control assembly 24.

At this location, the sheet control assembly 24 is upstream of the rotary drum 20 and is configured to continuously control material discharged from the sheet die 14 to be applied as a formable sheet to the peripheral forming surface 22 on the rotary drum 20.

The second unit 18 can be guidingly moved in a predetermined path, indicated by the arrow 76, away from the FIG. 9 relationship into the setup relationship of FIG. 7, wherein a space at 78, between the first and second units 12, 18, is defined/enlarged. Within this space 78, an operator can maneuver readily to gain access to different regions of both the first and second units 12, 18 otherwise blocked or obstructed by the units 12, 18 in their operating relationship. For example, by maneuvering within the space 78, a different accessibility to the sheet die 14 is afforded to the upstream end of the second unit 18 which supports the components of the sheet control assembly 24.

In this embodiment, parallel rails 80a, 80b are provided on a raised support pad 82 fixed to the support 28. Guide blocks 84 on the frame 54 are strategically located to stably support the frame 54 and are keyed to the rails 80a, 80b to precisely and consistently guide the frame 54 in a linear path relative to the first unit 12, as indicated by the double-headed arrow 86. An appropriate drive 88 can be operated to move the frame 54, resulting in following movement of the second unit 18, in opposite directions along its predetermined path to change the first and second units 12, 18 selectively between the operating and setup relationships, respectively in FIGS. 9 and 7. Alternatively, the frame 54 can be manually moved in its path 86.

The frame 54 has a second pair of rails 90a, 90b which cooperate with blocks 92 on a frame 94 that is part of the third unit 32. The frame 94 has frame parts 96a, 96b of like construction joined by connecting structure 98 so that the frame parts 96a, 96b move as one piece. With the block and rail arrangement cooperating between the frame 94 and frame 54, the third unit 32 is guided relative to the first unit 12 and second unit 18 in a predetermined path, in this case a linear path indicated by the double-headed arrow 100.

Of course, the blocks and rails can be placed on either of the components which they guide in relative movement. Reversing/mixing locations makes an equivalent structure.

With this arrangement, the movement of the second unit 18 in its predetermined path relative to the first unit 12 causes the third unit 32 to follow movement thereof and move in its corresponding predetermined path. The third unit 32 is further movable independently of the second unit 18 in the same/parallel predetermined path.

Figure 10:
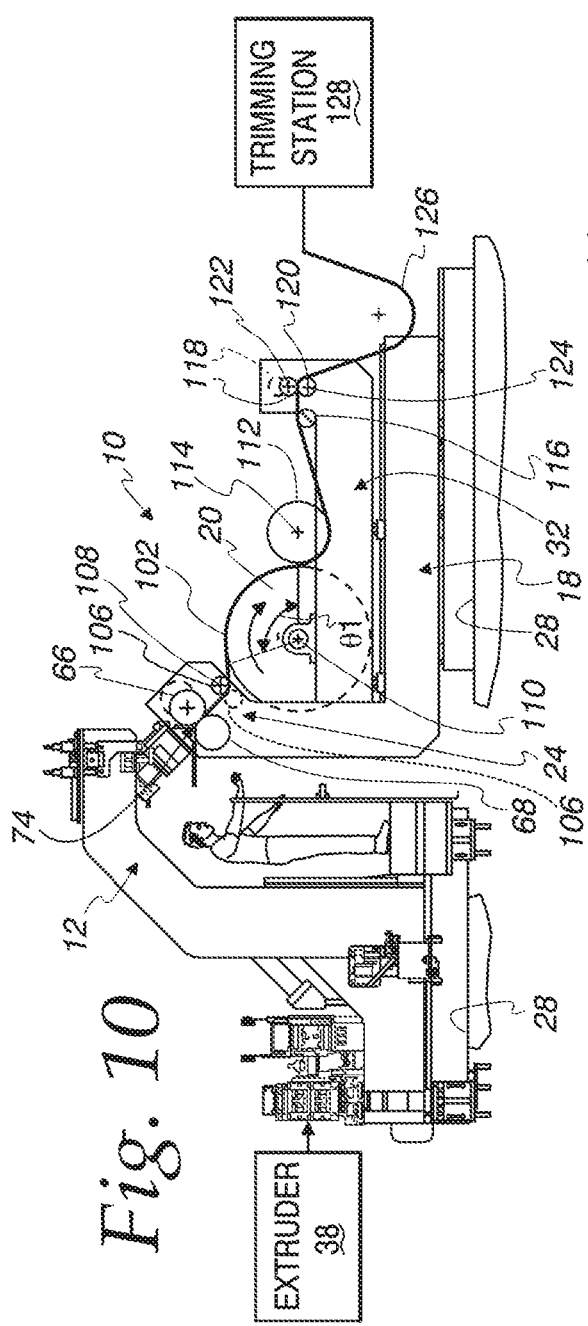
FIG. 10 is a view as in FIGS. 7-9, wherein the second and third units are each in an operating relationship with the first unit and a sheet is being advanced through the apparatus in a first travel path.
Figure 11:
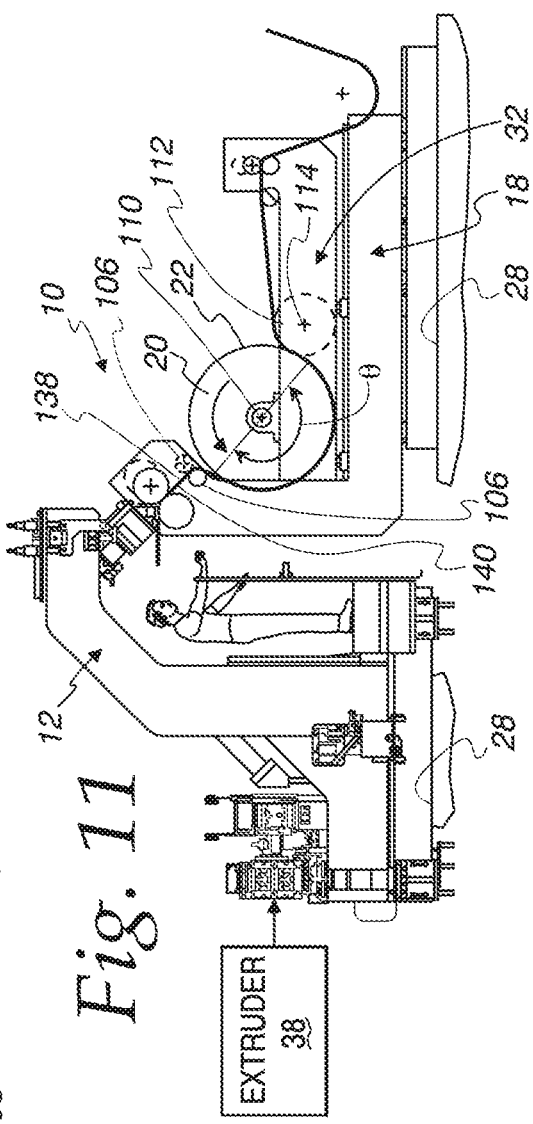
FIG. 11 is a view as in FIG. 10 with the sheet being advanced through the apparatus in a second travel path.

Accordingly, the first and third units 12, 32 are relatively repositionable between an operating relationship as shown in FIGS. 10 and 11 and different setup relationships as shown in FIGS. 7-9. In the operating relationship, the rotary drum 20 is situated so that the moldable sheet 102 downstream of the sheet control assembly 24 can be applied to the peripheral forming surface 22 on the rotary drum 20.

In the setup relationship as shown in FIG. 8, the aforementioned space 78 provides an access volume wherein the operator O can maneuver to also access the region around the rotary drum 20 between the frame parts 56a, 56b upstream of the rotary drum 20.

In a separate setup relationship, as shown in FIGS. 7 and 9, a separate space 104 is defined/enlarged between the frame legs 62 and the rotary drum 20. This permits a different access angle to the rotary drum 20 as well as to the downstream region of the sheet control assembly 24. Different regions of all of the units 12, 18, 32 may be made accessible other than those specifically described above by reason of creating the spaces/volumes resulting from the change in the relationship between the first, second, and third units 12, 18, 32.

A guide roller 106 is provided on the second unit 18 and makes up part of the sheet control assembly 24. The guide roller 16 is movable generally tangentially relative to the peripheral forming surface 22 of the rotary drum 20, as indicated by the change in position between solid and dotted lines in exemplary FIGS. 10 and 11, in which the first unit 12 is shown in an operating relationship with each of the second and third units 18, 32.

The guide roller 106 has an axis 108 that is substantially parallel to the axes 70, 72 of the cooperating rolls 66, 68, respectively.

As seen in FIG. 10, the sheet material exiting from the sheet die outlet is delivered to the entry location 74 whereupon the cooperating turning rolls 66, 68 cause it to be passed between the rolls 66, 68.

Downstream of the cooperating rolls 66, 68, the sheet 102 is directed either under the guide roller 106 to thereby set a "web over" the rotary drum 20 travel path, as shown in FIG. 10, or over the guide roller 106, as shown in FIG. 11, to thereby establish a "web under" the rotary drum 20 travel path for the sheet 102.

In the FIG. 10 setup, the rotary drum 20 moves clockwise around its axis 110, whereas in the FIG. 11 arrangement, the rotary drum 20 rotates in a counterclockwise direction around its axis 110.

Downstream of the rotary drum 20, a take-off wheel 112 is provided on the third unit 32. The take-off wheel 112 turns around an axis 114 that is parallel to the rotary drum axis 110, which is in turn parallel to the guide roller axis 108 and the axes 70, 72 of the cooperating rolls 66, 68.

The take-off wheel 112 is movable vertically at least between the FIGS. 10 and 11 positions relative to the rotary drum 20. In the FIG. 10 position, the sheet 102 departing from the rotary drum 20 wraps under the take-off wheel 112 and is extended downstream to over a support roll 116 and from there to between a pair of cooperating nipping rolls 118, 120.

By controlling the positions of the guide roller 106 and take-off wheel 112 relative to the rotary drum 20, the web over and web under travel paths in FIGS. 10 and 11, respectively, can be established.

Also, the degree of wrap of the sheet 102 against the peripheral forming surface 22 on the rotary drum 20 can be controlled. For example, as shown in FIG. 11, the web under wrap angle $\theta$ is approximately 180°, whereas the corresponding wrap angle $\theta 1$ in FIG. 10 is considerably less. By strategically changing the relationship between the guide roller 106, the take-off wheel 112, and the rotary drum 20, the degree of wrap against the peripheral forming surface 22 can be strategically selected.

The nipping rolls 118, 120 turn around parallel axes 122, 124, respectively. In this embodiment, the spacing between the nipping rolls 118, 120 is changeable, as indicated by the different solid and dotted line positions for the exemplary movable nipping roll 118. Accordingly, an appropriate nip spacing can be selected. The nipping rolls 118, 120 thus effect further processing of the sheet 102 advanced away from the rotary drum 20.

Downstream of the nipping rolls 118, 120 a web loop 126 is formed from the sheet 102 which is advanced therefrom to a trimming station 128, whereat further processing of the sheet 102 is carried out, as described in greater detail below.

To stabilize the sheet 102 throughout its travel path between the sheet die 14 and the trimming station 128, and to avoid distortion thereof, at least the rolls 66, 68 on the sheet control assembly 24, the rotary drum 20, and the downstream nipping rolls 118, 120 are driven by one drive or multiple coordinated drives shown schematically at 130, around their respective axes. Temperature control of all of these components is also contemplated to predictably and consistently form the desired sheet form without distortion occurring as the sheet moves through the apparatus 10.

With the coordinated drive of the various components, the sheet 102 can be moved between upstream and downstream ends of the apparatus in a path at a rate of anywhere from 20-250 feet/minute.

It is not necessary to describe in detail how the sheet is formed while being applied against the peripheral forming surface 22 on the rotary drum 20. Typically, discrete contours are formed complementary to desired end piece shapes. Temperature is controlled to maintain formed/impressed shapes. As noted in the Background section herein, without limitation, exemplary parts may be shallow parts such as cup lids, etc.

It is also contemplated that the formed sheet may be processed other than to produce discrete parts. For example, the formed sheet may be processed downstream of the rotary drum 20 by accumulating the sheet in roll form or severed sheet lengths.

The sheet departing from the cooperating rolls 66, 68 must be maintained at a moldable temperature. In a preferred form, temperature control structure 132 is provided to maintain a desired temperature range for the peripheral surfaces 134, 136 of the rolls 66, 68 which respectively contact opposite surfaces 138, 140 on the sheet 102 advancing therebetween. Typically, but without limitation, the rolls 66, 68 will be maintained in a temperature range of 100°–600° F.

The molten/moldable sheet material will readily conform to the contours at the peripheral surface 22 of the rotary drum 20. A vacuum source 142 may be incorporated into the rotary drum 20 to radially draw the sheet material into full conformity with the shapes on the peripheral surface 22 thereof, as may correspond to completed part/product.

In addition to controlling thickness and temperature, the cooperating rolls 134, 136 also condition the opposite sheet surfaces which reflects in the condition of the opposite surfaces of the completed products. That is, high surface quality and aesthetics are achievable for both sides of the sheet 102 upstream of the rotary drum 20, which contacts only one side of the sheet. Thus, both sides of a completed product may have optimal surface characteristics.

The trimming station 128 is configured to remove scrap from the discrete parts shaped into the sheet by the peripheral forming surface 22 of the rotary drum 20.

The third unit 32 can be repositioned by operating a drive 144 mounted on the second unit 18 and/or the support 82. Manual movement thereof is also contemplated.

Figure 12:
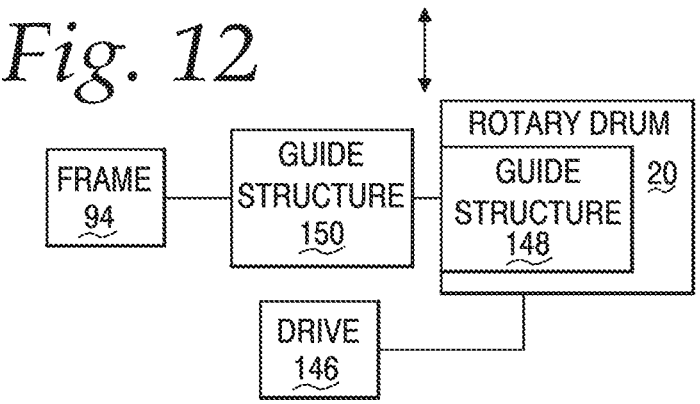
FIG. 12 is a schematic representation of guide structure cooperating between a rotary drum on the third unit and a frame on the second unit.
Figure 13:
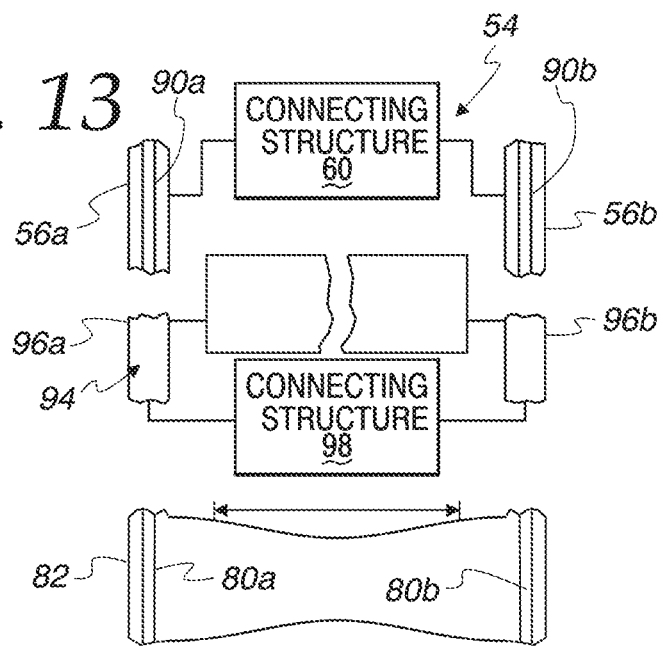
FIG. 13 is a fragmentary, partially schematic, plan view showing specific forms of guide structure between: a) the second and third units; and b) the second unit and a support for the apparatus.

As shown in FIG. 12, the rotary drum 20 may also be moved relative to the third unit frame 94 by an appropriate drive 146, or manually. Guide structure 148 may be provided on a support for the rotary drum 20 that cooperates with guide structure 150 on the frame 94 to allow precise, controlled movement of the rotary drum 20 side-to-side on the apparatus to effect appropriate alignment with the sheet 102.

While not limiting, the axial dimension of the rotary drum 20 will commonly be in the range of 12" to 96" to handle sheet thicknesses typically in the range of 5-100 mils. A diameter range, while not limiting, is typically between 36" and 120".

The guide structure 148, 150 is intended to be a generic guide structure used to control movement of the rotary drum 20 relative to the frame 94 and is also intended to be generic to the structure that guides the second and third units 18, 32 relative to each other and the second unit relative to the first unit 12. Within this generic showing are contemplated all different forms of linear and non-linear guided movement, in the latter case including, without limitation: a) linear bearings on captured rails; b) cam followers; c) sliders; and d) rollers. Exemplary forms of such linear guides are shown in U.S. Pat. No. 8,021,140, the disclosure of which is incorporated herein by reference.

These guide structures permit precision relative movement of units and other components.

Figure 14:
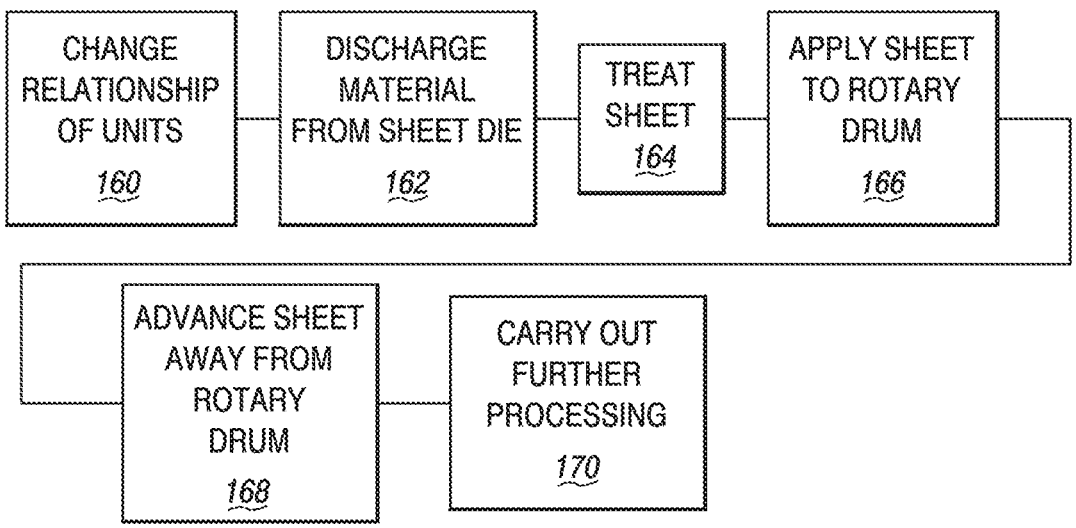
FIG. 14 is a flow diagram representation of a method of processing a formable material according to the invention.
Figure 17:
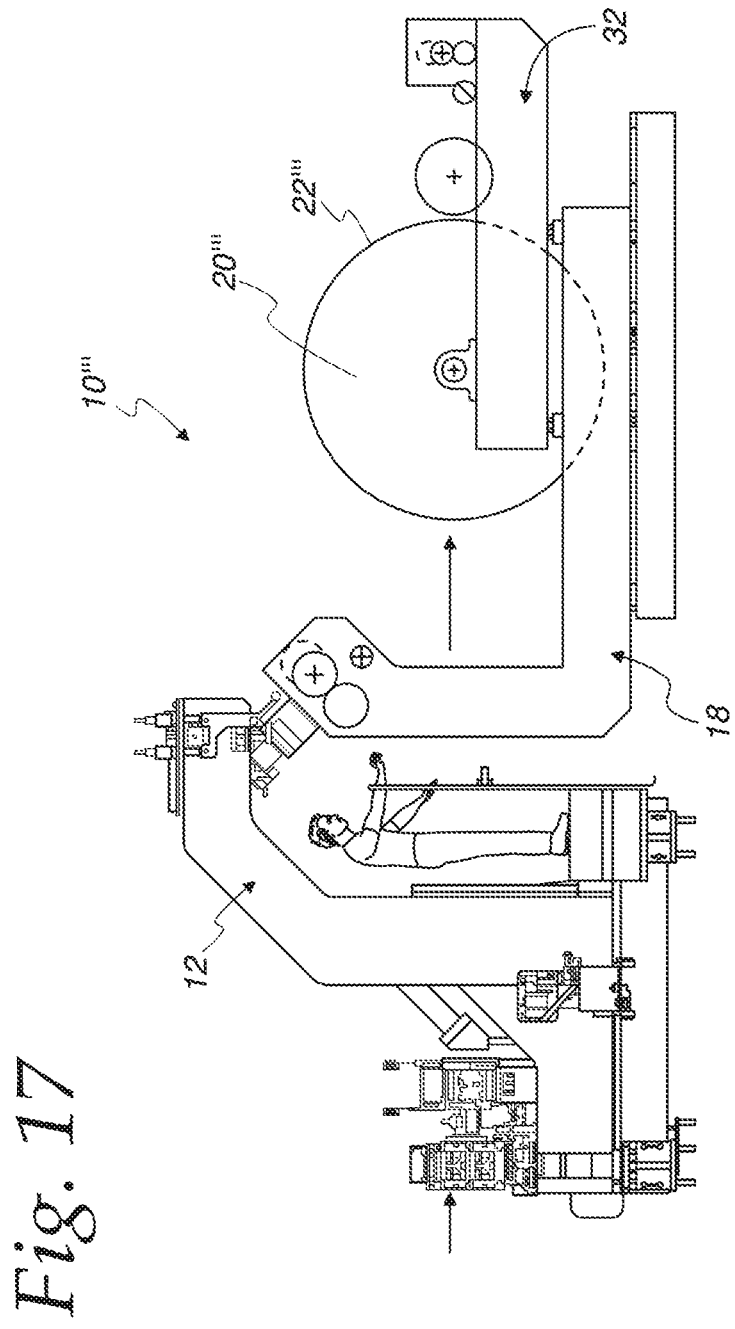
Figure 18:
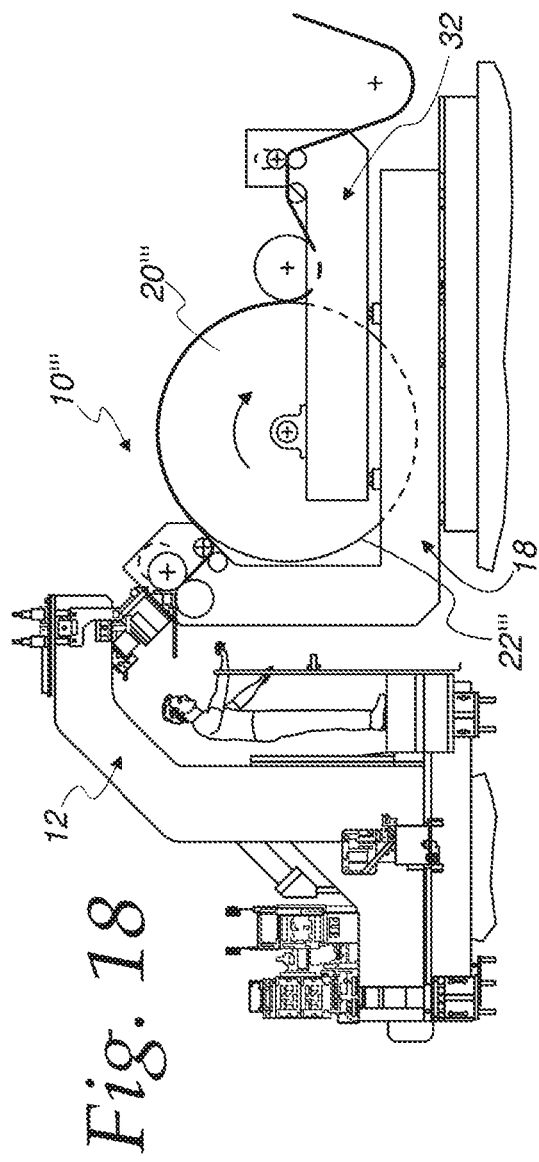
Figure 19:
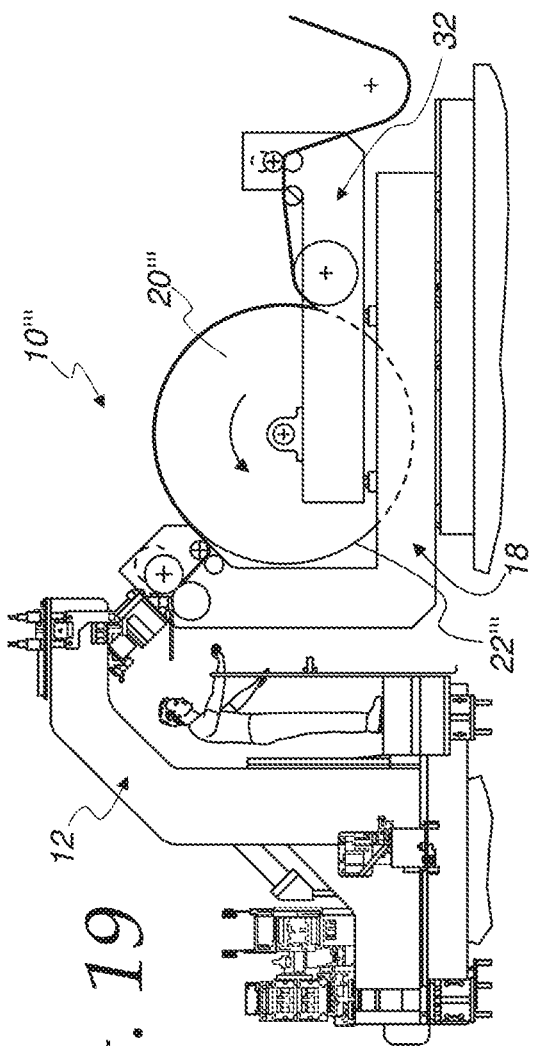

With the structures described above, a method of processing a formable material can be carried out as shown in flow diagram form in FIG. 14.

As shown at block 160, the relationship between at least the first and second units can be changed to allow, for example, setup, interchanging of different components, maintenance, etc., and whereupon the operating relationship can be established.

As shown at block 162, material from the supply is discharged from the sheet die at the entry location on the sheet control assembly.

As shown at block 164, through at least the sheet control assembly, the moldable sheet is treated including establishing a selected thickness.

As shown at block 166, the moldable sheet is applied to the peripheral forming surface on the rotary drum as the rotary drum is turned around its axis to thereby be shaped by contours on the forming surface.

As shown at block 168, the applied/formed sheet is separated from and advanced away from the rotary drum.

As shown at block 170, further processing of the sheet downstream of the rotary drum is carried out. This may include, for example, accumulating a sheet form in rolls or stacks, trimming the sheet to separate parts, processing/reprocessing scrap, packing parts through handling equipment, etc.

Another aspect of the invention is the ability to substitute rotary drums with different characteristics, as well as one or more components adapted to a particular drum configuration.

As one example, as shown in FIGS. 15-19, a rotary drum 20''', corresponding to the rotary drum 20, is used in conjunction with the same first, second, and third units 12, 18, 32, as previously described on the apparatus 10'''. The rotary drum 20''' has a diameter D that is substantially greater than the diameter D1 (FIG. 7) of the rotary drum 20.

The apparatus 10''' in FIGS. 15-19 differs from the system 10 only by reason of incorporating the different rotary drum 20'''. The apparatus 10''' operates in substantially the same manner as the apparatus 10, with FIGS. 15-19 corresponding successively to FIGS. 7-11. The operating relationship between the first and third units 12, 32 is slightly different to accommodate the larger diameter rotary drum 20''.

In addition to the different diameter, the rotary drum 20''' may have a different configuration on the peripheral forming surface 22''' to produce different part shapes or sizes.

The operating description with respect to FIGS. 7-11, set forth above, applies equally to FIGS. 15-19.

The foregoing disclosure of specific embodiments is intended to be illustrative of the broad concepts comprehended by the invention.

The invention claimed is:

1. A method of processing a formable material, the method comprising the steps of:
    obtaining an apparatus comprising:
    a) a first unit comprising a sheet die configured to controllably discharge a material in flowable form delivered from a supply to the sheet die;
    b) a sheet control assembly; and
    c) a second unit comprising a rotary drum having a peripheral forming surface,
    the sheet control assembly upstream of the rotary drum and configured to continuously control material discharged from the sheet die to be applied as a formable sheet to the peripheral forming surface on the rotary drum;
    selectively controllably relatively situating the first and second units between: i) an operating relationship wherein the sheet die is situated relative to the sheet control assembly to discharge material at an entry location on the sheet control assembly; and ii) a setup relationship wherein a space is one of defined or enlarged, as an incident of the first and second units being changed from the operating relationship, within which an operator can maneuver to gain access to a region of at least one of the first unit and second unit;
    changing the first and second units from the setup relationship into the operating relationship by guidingly moving at least one of the first and second units relative to the other of the first and second units in a first predetermined path;
    with the first and second units in the operating relationship: A) causing the material from the supply to be discharged from the sheet die at the entry location; B) causing the sheet control assembly to treat the discharged material which is a moldable sheet of predetermined thickness; C) causing the moldable sheet to be applied to the peripheral forming surface on the rotary drum as the rotary drum is turned around an axis; D) causing the applied sheet to separate from and advance away from the rotary drum; and E) causing further processing of the sheet downstream of the rotary drum,
wherein the step of obtaining an apparatus comprises obtaining an apparatus comprising a third unit, the third unit comprising the rotary drum:
selectively controllably relatively situating the first and third units between: a) an operating relationship wherein the rotary drum is situated so that the moldable sheet from the sheet control assembly can be applied to the peripheral surface on the rotary drum; and b) a setup relationship wherein a space is one of defined or enlarged, as an incident of the first and third units being changed from their operating relationship, within which an operator can maneuver to gain access to a region of at least one of the first, second, and third units; and
wherein the method further comprises the steps of: i) placing the first and second units into their operating relationship; ii) changing the first and third units from their setup relationship into their operating relationship by guidingly moving at least one of the first and third units relative to the other of the first and third units in a second predetermined path; and iii) with the first and second units in their operating relationship and the first and third unit in their operating relationship, carrying out steps A)-E).

2. The method of processing a formable material according to claim 1 wherein the step of changing the first and third units between their setup and operating relationship comprises moving the third unit in the second predetermined path.

3. The method of processing a formable material according to claim 2 wherein the third unit is provided on the second unit, the second unit is movable relative to the first unit in the first predetermined path and further comprising the step of moving the third unit together with the second unit as the second unit is moved in the first predetermined path.

4. The method of processing a formable material according to claim 3 further comprising the step of moving the third unit guidingly relative to the second unit as the third unit is moved in the second predetermined path.

5. The method of processing a formable material according to claim 4 wherein the first and second predetermined paths are substantially straight.

6. The method of processing a formable material according to claim 5 wherein the first and second predetermined paths are substantially parallel.

7. The method of processing a formable material according to claim 1 further comprising the step of guidingly moving the rotary drum relative to the sheet die in a direction substantially parallel to the axis of the rotary drum.

8. The method of processing a formable material according to claim 1 wherein the peripheral forming surface on the rotary drum is contoured and the step of applying the moldable sheet to the peripheral forming surface comprises causing the moldable sheet to conform to the contoured peripheral forming surface to thereby form discrete part shapes in the sheet.

9. The method of processing a formable material according to claim 8 wherein the step of further processing the sheet comprises trimming the sheet to separate discrete parts.

10. The method of processing a formable material according to claim 1 wherein the sheet control assembly comprises first and second cooperating rolls, the sheet has oppositely facing surfaces and further comprising the step of conditioning the oppositely facing sheet surfaces, one each with the first and second rolls.

11. The method of processing a formable material according to claim 1 wherein the rotary drum has a first diameter and further comprising the step of substituting for the rotary drum with the first diameter a replacement rotary drum of a second diameter that is different than the first diameter.

12. The method of processing a formable material according to claim 8 wherein the peripheral forming surface of the rotary drum has a first contoured configuration and further comprising the step of substituting for the rotary drum a replacement rotary drum with a contoured configuration different than the first contoured configuration.

13. The method of processing a formable material according to claim 1 wherein the third unit comprises a cooperating pair of nipping rolls downstream of the forming drum and the step of causing further processing comprises causing the sheet advanced away from the forming drum to be advanced to and between the cooperating pair of nipping rolls.

14. The method of processing a formable material according to claim 1 wherein the sheet control assembly comprises first and second cooperating rolls, and further comprising the step of strategically controlling temperature of the sheet applied to the peripheral forming surface of the rotary drum through the first and second rolls.

15. The method of processing a formable material according to claim 14 further comprising the step of causing each of the first and second cooperating rolls to be driven.

16. The method of processing a formable material according to claim 1 further comprising the step of obtaining the supply of material comprising a plastic material that is at least one of: polypropylene (PP); polystyrene (PS); polylactic acid (PLA); a bio-resin; polyethylene terephthalate (PET); and polyethylene (PE).

17. The method of processing a formable material according to claim 1 wherein the sheet is moved between upstream and downstream ends of the apparatus in a path at a rate of 20-250 feet per minute.

18. The method of processing a formable material according to claim 13 wherein the sheet control assembly comprises first and second cooperating rolls, and further comprising the step of causing each of the first and second cooperating rolls, the forming drum, and the cooperating pair of nipping rolls to be driven around respective axes.

19. The method of processing a formable material according to claim 1 further comprising the step of strategically causing a degree of wrap of the sheet against the peripheral forming surface on the rotary drum to be changed.

20. The apparatus recited in claim 1.

21. The apparatus according to claim 20 wherein the second unit moves in the first predetermined path relative to the first unit.

22. The apparatus according to claim 20 wherein the third unit moves in the second predetermined path relative to the first unit.

23. The apparatus according to claim 21 wherein the second unit is guided in linear movement relative to a support in the first predetermined path through at least one of: a) linear bearings on captured rails; b) cam followers; c) sliders; and d) rollers.

24. The apparatus according to claim 23 wherein the apparatus further comprises a drive for moving the second unit selectively in opposite directions in the first predetermined path.

25. The apparatus according to claim 22 wherein the third unit moves in the second predetermined path through cooperating guide structure on the second and third units.

26. The apparatus according to claim 25 wherein the second unit moves in the first predetermined path relative to the first unit and the apparatus is configured so that the third unit is caused to move in the second predetermined path by following movement of the second unit in the first predetermined path.

27. The apparatus according to claim 26 wherein the second and third units are guided in linear relative movement relative to each other through at least one of: a) linear bearings on captured rails; b) cam followers; c) sliders; and d) rollers.

28. The apparatus according to claim 20 wherein the rotary drum is movable guidingly on the second unit in a direction transverse to the second predetermined path.

29. The apparatus according to claim 20 wherein the peripheral surface on the rotary drum is contoured to form discrete parts shapes in a moldable sheet applied thereagainst.

30. The apparatus according to claim 20 wherein the sheet control assembly comprises first and second cooperating rolls and the first and second cooperating rolls are configured to set a sheet thickness and to condition opposite surfaces of a sheet directed therebetween.

31. The apparatus according to claim 20 further comprising a guide roller on the second unit that is movable to strategically change a degree of wrap of a sheet against the peripheral forming surface on the rotary drum.

32. The apparatus according to claim 20 wherein the apparatus further comprises a cooperating pair of nipping rolls downstream of the rotary drum between which a sheet being formed is directed.

33. The apparatus according to claim 20 wherein the apparatus further comprises a trimming station configured to separate discrete parts defined by discrete shapes in a sheet produced by the peripheral forming surface on the rotary drum.

34. The apparatus according to claim 20 wherein the apparatus further comprises a take-off wheel downstream of the rotary drum to guide movement of a sheet away from the rotary drum.

35. The apparatus according to claim 32 wherein the sheet control assembly comprises first and second cooperating rolls, and the apparatus comprises at least one drive for driving each of the first and second cooperating rolls, the cooperating pair of nipping rolls, and the rotary drum around respective axes.

36. The apparatus according to claim 20 wherein the sheet control assembly comprises first and second cooperating rolls, and the apparatus further comprises temperature control structure on the first and second cooperating rolls.

37. The apparatus according to claim 32 wherein the sheet control assembly comprises first and second cooperating rolls and a spacing between: a) the rolls in the cooperating pair of nipping rolls; and b) the first and second cooperating rolls is selectively variable.

38. The apparatus according to claim 20 wherein the peripheral forming surface of the rotary drum has an axial dimension in the range of 12" to 96".

* * * * *